United States Patent [19]
Wallace

[11] 3,888,036
[45] June 10, 1975

[54] SINKER AND SWIVEL SHIELD

[76] Inventor: Maynard Wallace, 38172 Seaway Dr., Mt. Clemens, Mich. 48073

[22] Filed: Jan. 2, 1974

[21] Appl. No.: 430,253

[52] U.S. Cl. ............................................. 43/44.97
[51] Int. Cl. .................................................. A01k 95/00
[58] Field of Search .......... 43/44.97, 44.9, 42.1, 41, 43/41.2, 43.1

[56] References Cited
UNITED STATES PATENTS

| | | | |
|---|---|---|---|
| 883,048 | 3/1908 | Pflueger | 43/43.1 |
| 2,241,367 | 5/1941 | Sarff | 43/42.1 |
| 2,242,965 | 5/1941 | Adams | 43/43.1 |
| 3,667,151 | 6/1972 | Lamb | 43/44.97 |
| 3,686,787 | 8/1972 | Milovich | 43/41.2 |

*Primary Examiner*—Warner H. Camp
*Attorney, Agent, or Firm*—Harness, Dickey & Pierce

[57] ABSTRACT

A shield for the sinker and swivel of a fishing line, especially useful when trolling. The shield is of hollow conical shape with an aperture at its apex for the line, the swivel and sinker being enveloped by the shield so as to prevent snagging on weeds or rocks. The shield is preferably of a brightly colored resilient plastic material and has inner ridges slightly spacing it from the sinker so that the latter will not jam in the shield, and the shield will bounce clear of rocks.

5 Claims, 5 Drawing Figures

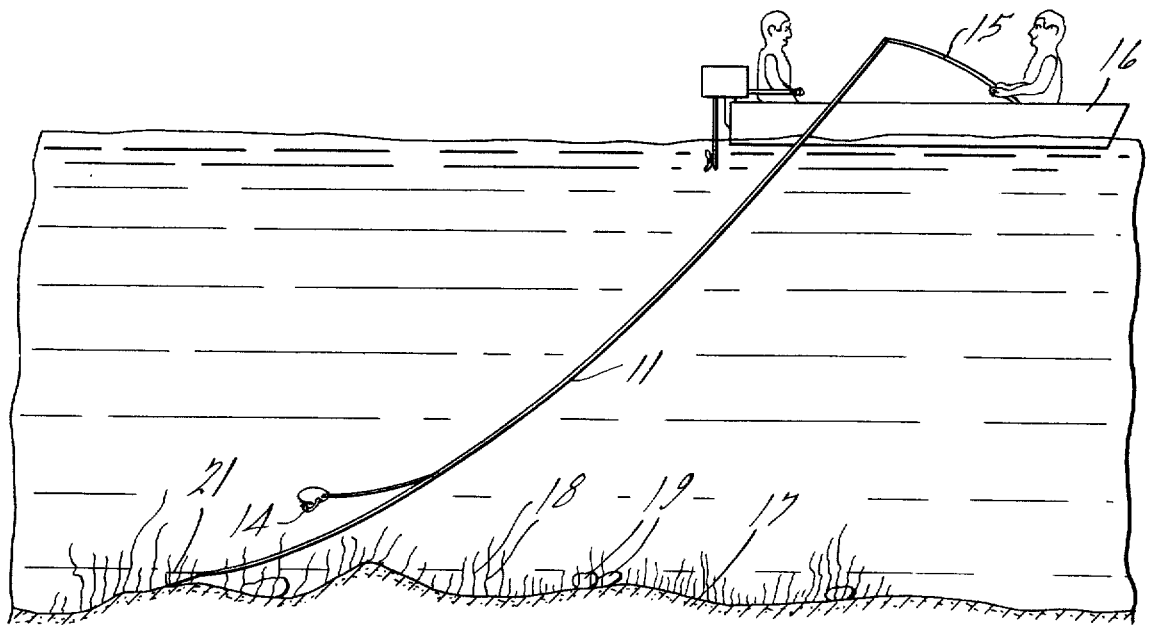
FIG. 1.
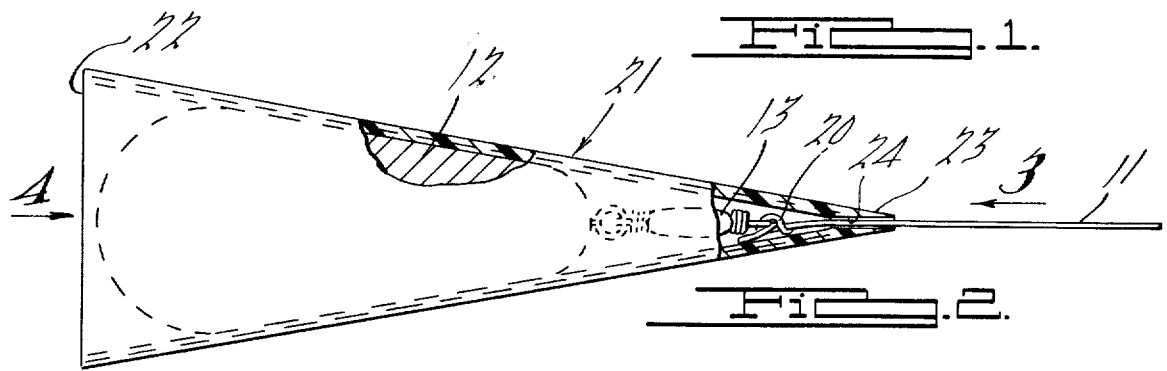
FIG. 2.
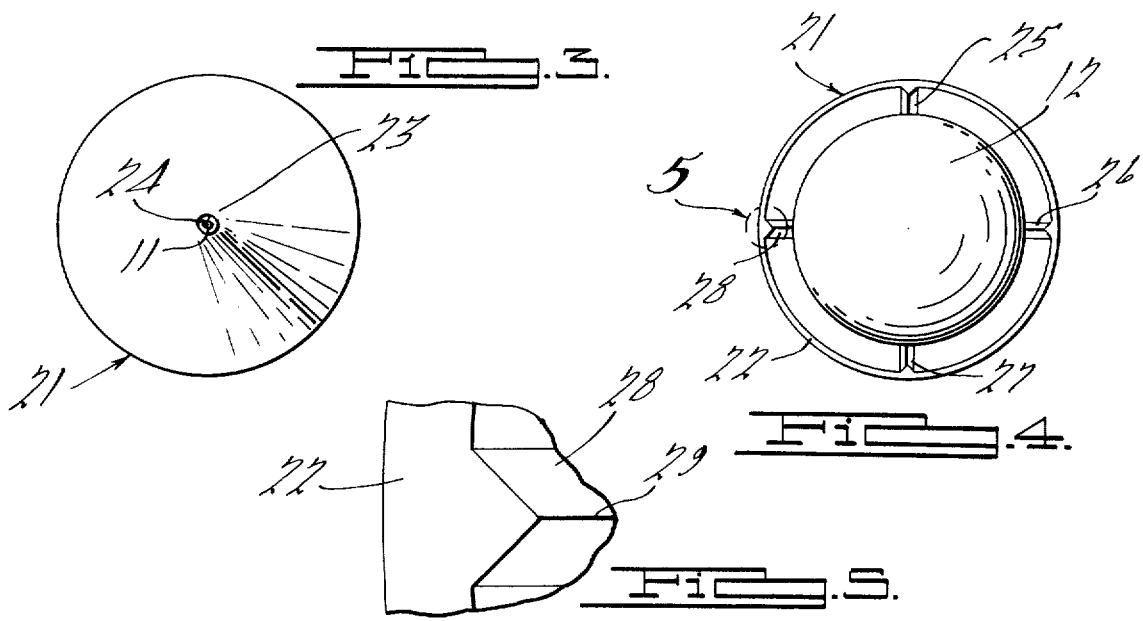
FIG. 3.
FIG. 4.
FIG. 5.

SINKER AND SWIVEL SHIELD

BACKGROUND OF THE INVENTION

1. Field of the Invention

The invention relates to fishing gear, and more particularly to means for preventing rocks or weeds from snagging a fishing line, especially one that has a sinker and swivel dragged along the bottom as in trolling.

It is an object of the invention to provide a novel and improved sinker and swivel shield which will enable the sinker and its swivel to be dragged along weedy or rocky bottoms with minimized danger of snagging.

It is a further object to provide a novel and improved sinker and swivel shield having these characteristics, which permits the sinker to bounce clear of rocks.

Briefly, the invention comprises a hollow conical member fabricated of a resilient plastic material and having an open base and an apertured apex. The member has internal ridges for spacing the sinker a slight distance inwardly of the wall of the member. In use, the fishing line is passed through the aperture and tied to the swivel, and the sinker and swivel are moved into the shield. The latter will then act to protect both the swivel and sinker from being snagged on weeds or rocks. The resiliency of the member will cause it to bounce off rocks, and the material may be brightly colored to attract fish.

BRIEF DESCRIPTION OF THE DRAWINGS

FIG. 1 is an elevational view showing the manner in which the invention is used for trolling.

FIG. 2 is an enlarged and partially sectioned view in elevation of the shield, showing the sinker and swivel enclosed therein.

FIG. 3 is an end view of the shield taken in the direction of the arrow 3 of FIG. 2.

FIG. 4 is an end view of the base of the shield taken in the direction of arrow 4 of FIG. 2.

FIG. 5 is an enlarged view taken in the area marked 5 of FIG. 4 and showing the construction of one of the internal ridges of the shield.

DESCRIPTION OF THE PREFERRED EMBODIMENT

The invention is intended to be used in conjunction with a fishing line 11 carrying a sinker 12 and a swivel 13 at its outer end and one or more hooks 14 with lures, bait or the like attached at intermediate points along the line 11. When line 11 is attached to a fishing rod 15 and used for example in trolling from a boat 16 over a bottom 17, the possibility would ordinarily exist of the sinker or swivel, or the knot 20 attaching line 11 to the swivel, snagging on weeds 18 or rocks 19 along the bottom.

The invention is intended to obviate such difficulties and comprises a shield generally indicated at 21 adapted to surround and enclose the sinker and swivel in such manner as to prevent snagging. Shield 21 is preferably fabricated of a resilient plastic material such as polypropotine or a similar resilient substance which will achieve the requisite bouncing effect described below, and has proper durability. The shield is also preferably brightly colored to help attract fish.

Shield 21 is of hollow conical shape, having an open base 22 and an apex 23. The height of the cone is shown as being considerably greater than the width of the base so as to accommodate sinker 12 and swivel 13. Although a "bell" sinker is shown as being used with the invention, it is also usable for other shapes of sinkers.

Apex 23 of shield 21 has an aperture 24 for receiving the end of fishing line 11. The interior of shield 21 is provided with a plurality of longitudinal ridges, four equidistantly spaced ridges 25, 26, 27, and 28 being shown in the illustrated embodiment. The wall of shield 21 is relatively thin, perhaps 0.020 inches thick, and ridges 25 through 28 are correspondingly shallow, on the order perhaps of 0.015 inches deep. The ridges have conical cross-sectional shapes with apices 29 as shown in FIG. 5 and run the entire length of the shield interior with the exception, of course, of aperture 24.

In use, the angler will pass the end of fishing line 11 through aperture 24 and slide shield 21 further up on the line so that he may attach swivel 13 with knot 20, sinker 12 being attached to the other end of the swivel. The swivel and sinker will then be drawn into shield 21, assuming the position of FIG. 2. It will be observed that when so arranged knot 20, swivel 13 and sinker 12 will be entirely surrounded and enclosed. Therefore, when shield 21 is dragged along bottom 17 there is no possibility of the knot, swivel, or sinker snagging on weeds 18 or rocks 19. Because of ridges 25, 26, 27 and 28, a slight space will exist between the wall of shield 21 and sinker 12. The existence of this space and the resiliency of the material from which shield 21 is fabricated will enable the shield to bounce clear of rocks. Furthermore, the ridges will prevent the sinker from being jammed within the shield so that the latter may be removed from the sinker when desired.

I claim:

1. A shield for sinkers and swivels used on the ends of fishing lines, comprising a hollow thin-walled conical member fabricated of resilient material, the wall being conical, relatively thin and of constant thickness substantially throughout its entire length whereby its resilience will permit it to bounce off rocks, the member being provided with an open base and an apertured apex for receiving the end of the fishing line, whereby the fishing line may be drawn through the shield and attached by a knot to the swivel and sinker, the size of the aperture in said apex being sufficient to allow the fishing line to pass freely therethrough but substantially less than that of the swivel whereby the swivel and knot may not pass therethrough even when tensile force is applied to the line, the relative dimensions of the shield and sinker being such that when the fishing line is drawn back through the apertured apex, the sinker will engage internal surfaces of said shield when the sinker, swivel and knot are enclosed by the shield so as to prevent snagging on weeds or rocks, and the swivel will be held free of the inside surface of said member whereby it may effectively perform its swivelling function to permit said sinker and shield to rotate together as a unit.

2. The combination according to claim 1, wherein said internal surfaces comprise a plurality of internal ridges within said shield whereby the sinker will engage said ridges to maintain a slight space between the sinker and shield wall.

3. The combination according to claim 2, said ridges extending longitudinally along the interior of the shield wall and having a conical cross-sectional shape.

4. The combination according to claim 3, there being four such ridges equidistantly spaced around the shield interior.

5. The combination according to claim 1, said shield being fabricated of a plastic material such as polypropotine and being brightly colored to attract fish.

* * * * *